Oct. 5, 1971     C. J. VALENTINE     3,610,011
UNITARY ROLL FORMED VEHICLE FENDER AND APPARATUS
AND METHOD FOR PRODUCING THE SAME
Original Filed May 2, 1968     2 Sheets-Sheet 1

INVENTOR.
CLARK J. VALENTINE
BY Fraser and Bogucki
ATTORNEYS

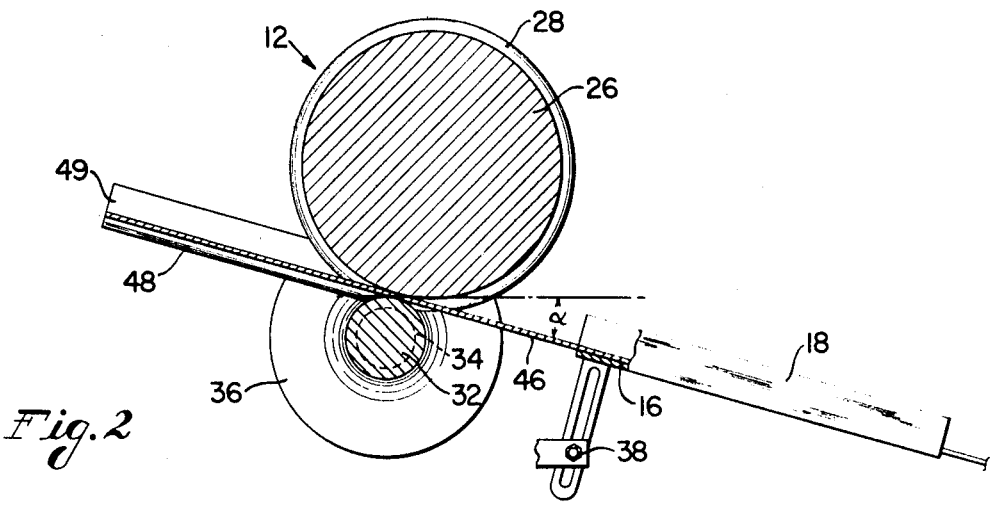
Fig. 2
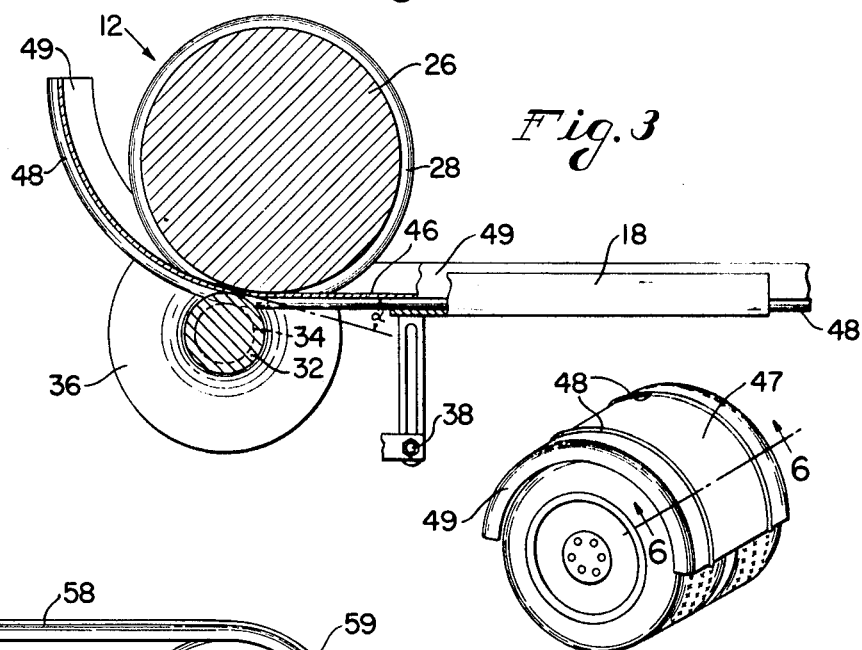
Fig. 3
Fig. 4
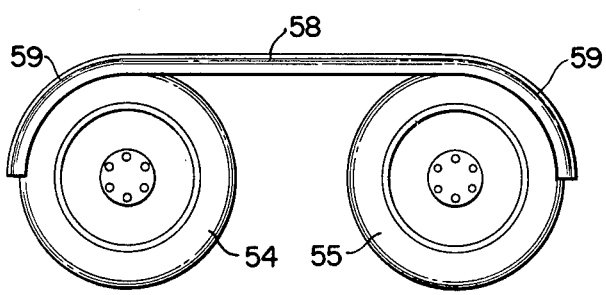
Fig. 5
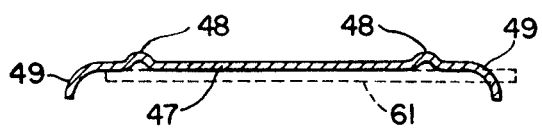
Fig. 6
INVENTOR.
CLARK J. VALENTINE
BY Fraser and Bogucki
ATTORNEYS

United States Patent Office 3,610,011
Patented Oct. 5, 1971

3,610,011
UNITARY ROLL FORMED VEHICLE FENDER AND APPARATUS AND METHOD FOR PRODUCING THE SAME
Clark J. Valentine, 15741 Gundry Ave., Paramount, Calif. 90723
Original application May 2, 1968, Ser. No. 726,073. Divided and this application June 2, 1969, Ser. No. 843,262
Int. Cl. B21h 7/00; B21d 5/14, 53/88
U.S. Cl. 72—177　　　　　　　　　　　　　8 Claims

ABSTRACT OF THE DISCLOSURE

This disclosure relates to a novel unitary fender construction for vehicles such as trucks with dual or tandem wheels providing, in particular, ease of attachment, durability and effective splash protection. The construction includes an arcuate portion conforming to the circumference of the vehicle tire and has longitudinal reinforcing ribs as well as integral side skirts or returns. The arcuate portion has a planar cross section except for the reinforcing ribs allowing ease of installation with flat brackets. The ribs are so positioned as to absorb the excess metal from the skirt or return formation. The disclosure also includes a two-roller roll forming machine which forms the entire fender including transverse and longitudinal bends. Also disclosed is a two-pass method for producing fenders of a variety of diameters or designs for dual or tandem wheels.

This is a division of application Ser. No. 726,073, filed May 2, 1968, and now abandoned.

BACKGROUND OF THE INVENTION

Customarily, larger trucks or vehicles are manufactured without rear fenders because of the many varieties of load carrying bodies which may later be installed, some requiring and some not needing fenders. Consequently, rear fenders for such trucks requiring their addition are usually custom produced in individual or small quantities to fit particular tire diameters of single or tandem wheel assemblies and particular mounting requirements. This necessarily has resulted in disproportionately high costs. Moreover the investment in rolling facilities to produce fenders for each different requirement is impractical. Also in the past unitary rolled skirted fenders have been produced only with a crowned shape because of heretofore present limitations in rolling techniques. The crowned fender is difficult to install and requires special crowned mounting brackets rather than simple planar brackets at unnecessary additional cost.

Rib reinforced fenders have been known in the prior art as represented by the U.S. Pat. 968,239 which uses a separate planar side skirt.

In the past, fender rolling equipment has required multiple roll formers with numerous passes to produce the finished fender, and has produced the crowned configuration mentioned above. A two-roller rolling machine is disclosed in U.S. Patent 3,304,757 using urethane rubber as one roll surface and an adjustable feed table. This prior art machine was designed to roll lighter gauge sheet steel than the thickness required for fenders of this invention, and had no provision for the rolling of other than longitudinally curved shapes.

Prior art rolling methods for producing integral body-skirt fenders have necessitated the rolling of crowned shapes because of the need to absorb excess metal from the reduced diameter skirt or return portion of the fender.

SUMMARY OF THE INVENTION

The invention resides primarily in a novel configuration of vehicle fender, and the apparatus and method for producing the same.

The fender is a single integral body having a longitudinal curve to conform with the tire in a conventional manner and a transverse configuration which includes a planar body portion, integral skirt or return portions and reinforcing rib portions so positioned that in the rolling operation the ribs absorb the excess metal from the skirt or return.

The fabricating machine of this invention includes a single pair of hard surfaced rolls having the desired fender cross section at their mating surfaces and having a feed table adjustable to produce the transverse bends when at a plane normal to the plane of the roll axes and producing the longitudinal bend when adjusted at an angle α with respect to the normal plane.

The process of this invention involves the two-pass formation of fenders of this invention with one pass of the flat sheet stock through the machine between the forming rolls in the plane of common tangency of the rolls, followed by a second pass through the same rolls at an entrance angle α relative to the common tangency plane. The radius of curvature of the fender can be made smaller by additional passes through the forming machine. Where a tandem wheel fender is desired the second pass through the forming rolls is performed with the first portion of the pass at an entrance angle α followed by a portion of a pass at zero entrance angle to form the straight section followed by the final portion again at an entrance angle α to complete the second curved portion.

BRIEF DESCRIPTION OF THE DRAWINGS

A better understanding of the present invention may be had from a consideration of the following detailed description, taken in a conjunction with the following drawings, in which:

FIG. 2 is a side view of the machine of FIG. 1 partly in section illustrating the first rolling operation in accordance with the invention;

FIG. 3 is a side view of the machine of FIG. 1 partly in section illustrating the second rolling operation in accordance with this invention;

FIG. 4 is a perspective view illustrating the use of a vehicle fender of the present invention upon a pair of dual wheels;

FIG. 5 is a side view of a vehicle wheel assembly illustrating the use of a vehicle fender of the present invention upon a tandem wheel assembly; and, FIG. 6 is a transverse section through a fender of FIG. 4 taken along line 6—6 of FIG. 4.

DETAILED DESCRIPTION OF THE INVENTION

Figure 1:
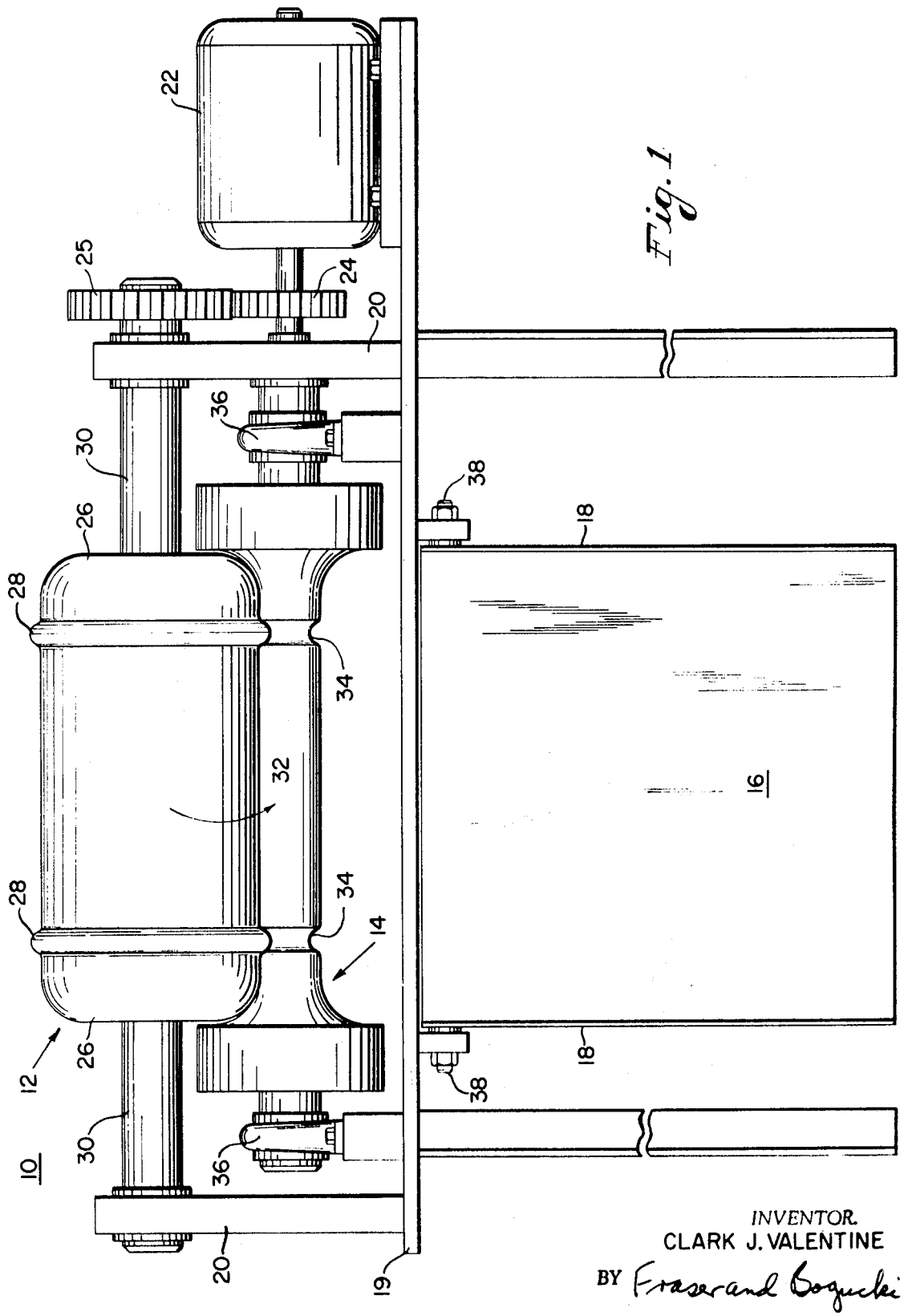
FIG. 1 is a front elevational view of an embodiment of a two-roll vehicle fender fabricating machine in accordance with the invention.

Referring to FIG. 1 which shows the entrance side of an embodiment of a two-roll vehicle fender fabricating machine 10, the fabricating machine 10 comprises two rolls 12 and 14, a hinged feed table 16 shown in a lowered position and having raised side rails 18, supporting structure or base 19, a motor 22 and gears 24 and 25.

The top roll 12 is generally cylindrical in shape except for two annular protuberances 28 near the ends which are rounded. The top roll 12 is shown mounted on shaft 30 which is journaled on support columns 20 and driven by the motor 22 through gears 24 and 25 or the like, although it may be driven by an individual motor drive system if desired.

The bottom roll 14 has a surface 32 mating with the top roll 12 including annular grooves 34 corresponding to the two annular protuberances 28 of the top roll 12. The bottom roll 14 includes flared ends to mate with the rounded ends 26 of the top roll 12. The roll 14 is similarly journaled for rotation on a pair of blocks 36 and directly driven by motor 22 at the same linear surface speed as the roll 12.

Both rolls 12 and 14 are preferably made of steel or a similar hard surfaced material and are driven by the single motor 22 coupled through suitable gears 24 and 25. The drive system is chosen for an angular velocity of the top roll 12 proportionately less than that of the bottom roll 14 so that the linear surface speeds of the planar mating surfaces of the two rolls 12 and 14 are equal.

The feed table 16, shown in a dropped position, is adjusted to the horizontal or to a selected angle $a$ below the horizontal by rotation on the two hinges 38 connecting the inboard end of the feed table 16 to the supporting structure 19. When the feed table 16 is at the angle $\alpha$ below the horizontal, its top surface coincides with the plane of common tangency of the two rolls 12 and 14, which are slightly displaced from vertical alignment.

The side rails 18 of the feed table 16 laterally restrain the sheet stock fed between the side rolls 12 and 14 and insure its entry normal to the axes of the rolls. The distance between the side rails 18 is sufficient to accommodate the sheet stock for the initial rolling operation. For the second rolling pass, an insert, not shown in the drawing, is placed on the feed table between the side rails 18 to position and laterally restrain the partially formed fender blank. The insert is shaped to accommodate the edge returns and rib corrugations formed on the first pass.

It should be noted that the forming rolls of the machine 10 have the rib forming protuberance 28 and matching groove 34 positioned in the region adjacent to the edge return forming ends 26. The position of the rib formers is significant not only for structural stiffness, but for esthetic considerations in the finished product. Additionally as will be more clearly understood from the following description of the rolling method, the rib formers 28 and 34 of the rolls 12 and 14 are so positioned as to produce an improved wrinkle-free return and an unbowed, planar central body portion of the fender.

Operation

Referring now to FIG. 2, a fully formed unitary fender is formed according to this invention by two passes through the machine of FIG. 1. First the feed table is positioned at the selected angle $\alpha$ below the horizontal (which provides alignment with the plane of tangency of the rolls). A flat sheet 46 of roll formable material such as 14-gauge sheet steel or the like is then positioned on the feed table and aligned for entry between the rolls 12 and 14. With the rolls turning at a lineal surface velocity on the order of 12' per minute, the sheet stock is fed between the rolls to form the transverse bends including the edge returns and rib corrugations. During the first pass with the feed table 16 at the angle $\alpha$ from the horizontal, the metal in the region of the return or edge portions 49 (see FIG. 6) is stretched or distorted and the excess must be absorbed in the remainder of the fender. This is advantageously effected by the positioning of the rib portions 48 which take up the extra metal resulting from the curving of the return portions 49.

After this first rolling operation the feed table is elevated to the horizontal by movement about the hinges 38 and the partially formed blank is fed between the rolls at the new entrance angle whereupon the longitudinal curve is formed. The angle $\alpha$ at which the workpiece is fed is a function of the desired diameter of the fender. It has been found that additional passes of the fender at the entrance angle $\alpha$ relative to the roll common tangent plane produces further reduction of the radius of curvature of the fender so that the same machine may be used for fabricating fenders for different size wheels.

When tandem wheel fenders of the type shown in FIG. 5 are to be produced, the second rolling operation is conducted in three steps. First the table is aligned with the common tangent plane (at the angle $\alpha$ below the horizontal) and the first longitudinal arc is rolled encompassing the fender blank. The motor 22 is then stopped or the rolls 12 and 14 are temporarily disengaged from the drive system while the table 16 is raised to the horizontal and the workpiece held in the table. The rolling operation is commenced again to pass the straight portion 58 through the rolls 12 and 14. As the workpiece reaches the terminal quarter or third of its length at the entry of the rolls, the operation is again halted and the table 16 lowered again by the angle $\alpha$. The rolling operation is then continued to complete the fender, such as is shown in FIG. 5.

During the initial forming pass, the cooperation between the rib stiffener 48 and end return formation 49 is significant. During the first pass through the machine 10 the ribs 48, shown best in FIGS. 4 and 6, tend to stretch the metal locally at the same time that the edge returns 49 are developing excess metal from the arcuate cross section being established. Thus the ribs 48 absorb the excess from the return portions 49 by virtue of their positions adjacent thereto and the depth of the ribs 48. Accordingly the ribs 48 not only serve to perform the conventional function of added stiffening for the fender, but advantageously eliminate the necessity heretofore present, of developing a crowned cross section by a more complicated rolling operation.

Particular products in accordance with the invention are illustrated in FIGS. 4, 5 and 6. The basic curved unitary fender is shown in FIG. 4 in position over a dual wheel assembly from a vehicle such as a truck or truck-tractor. The fender can be seen as conforming to the periphery of the pair of tires with the planar central section 47, edge return 49 and reinforcing ribs 48 clearly shown.

The fender is easily mounted on the vehicle by flat brackets welded or bolted to the planar underside of the fender and passing through a cutout in the inner return (not shown). If desired the fender may also be mounted by external brackets welded or bolted to the ribs; however this latter method of mounting is neither as reliable nor attractive, so the use of internal mounting brackets is preferred.

FIG. 5 illustrates the configuration of tandem wheel fenders made on the machine of FIG. 1 by employing the three-step process described above. It includes the central planar portion 58 between the curved end sections 59 which conform to the periphery of their respective wheels 54 and 55. In this configuration the ribs 48 are of importance in providing longitudinal stiffness to the fender while the edge returns provide torsional strength.

The cross section of any of the completed fenders is shown in FIG. 6 as including the integral ribs 48 in the planar portion 47 and the edge returns 49. Note in particular that the ribs 48 are positioned sufficiently close to the edge returns to be able to absorb the excess metal during the formation of the edge curve. The ease by which bracket 61 (shown in dashed lines) may be secured to the fender for mounting the fender to the truck frame is apparent from FIG. 6. The underside of the planar portion 47 forms an ideal surface for either weld or bolt attachment to the straight bracket 61.

From the foregoing description it may be seen that a simple effective machine and method have been developed to produce a novel vehicle fender construction. The machine employs only two rolls and produces transverse and longitudinal compound bends in fenders without requiring a change of rolls and with only two passes through the machine. Additional passes may be made to produce fenders of varying diameters as desired. According to the process of this invention fenders of any practical diameter, continuously curved or for tandem wheel design, may be developed merely by changing one parameter in accordance with the teaching above. The net result is the unitary fender design having improved strength, mountability and appearance.

A particular embodiment of the fabricating machine, method for rolling arcuate shapes, and article fabricated thereby in accordance with the invention has been described. It will be obvious to those skilled in the art however that various changes and modifications may be made therein without departing from the invention. It is intended, therefore, in the appended claims to include all changes and modifications which fall within the general concept and scope of the previously described invention.

What is claimed is:

1. Apparatus for roll forming unitary fenders and the like comprising:
    a single pair of forming rolls including a first roll having a planar body portion with at least one rounded end and an annular protuberance adjacent the rounded end;
    the second roll having a flared end mating with the rounded end of the first roll and having an annular groove corresponding to and mating with the annular protuberance of the first roll;
    means for driving the pair of forming rolls; and
    means for introducing sheet material to be formed between the rolls selectively in a plane aligned with the common tangent plane of the rolls and at an angle with respect to the common tangent plane to produce rib reinforced, edge returned, unitary, compound formed bodies.

2. Apparatus in accordance with claim 1 wherein said first roll includes two rounded ends and an annular protuberance adjacent each rounded end and wherein said second roll includes two flared ends and annular grooves corresponding to and mating with the rounded ends and protuberances of the first roll to produce a double edge returned structure.

3. The combination in accordance with claim 1 wherein said means for introducing sheet material between the rolls comprises a feed table adjustable between at least two positions, one with zero material entrance angle and the second at an acute angle with respect to the common tangent plane of entry of material to be formed.

4. A method of roll forming compound bend structures from sheet material comprising the steps of:
    introducing the sheet material to be formed between a pair of forming rolls substantially in the plane of common tangency of the rolls to form a contour including an edge bend and at least one longitudinal reinforcing rib in the region adjacent to the edge bend; and
    re-introducing the longitudinally formed sheet between the forming rolls at a selected angle with respect to the common tangency plane of the rolls to introduce longitudinal curvature to the material, whereby the excess material resulting from the contour forming of the edge bend material is absorbed by the adjacent formed longitudinal rib.

5. The method in accordance with claim 4 wherein the longitudinally formed sheet material is re-introduced repetitively at the selected angle to reduce successively the diameter of the finished structure.

6. The method in accordance with claim 4 wherein the sheet material re-introduced between the forming rolls is continuously passed through the rolls to form a continuous curved structure.

7. The method in accordance with claim 4 wherein the sheet material re-introduced between the forming rolls is passed partially through the rolls at an entrance angle α relative to the common tangency plane, and is passed partially through the rolls at an angle substantially of 0° relative to the common tangency plane, whereupon the formed structure includes a compound curved section joining a longitudinally straight transversely formed section.

8. The method in accordance with claim 7 wherein the terminal portion of the sheet material is passed through the forming rolls at an entrance angle α whereby a terminal longitudinal contour is introduced into the material.

References Cited

UNITED STATES PATENTS

| | | | |
|---|---|---|---|
| 968,239 | 8/1910 | Folsom | 280—153 |
| 1,376,497 | 5/1921 | Yoder | 72—168 |
| 1,753,829 | 4/1930 | Himmel et al. | 72—181 |
| 1,793,351 | 2/1931 | Bell | 72—180 |

FOREIGN PATENTS

| | | |
|---|---|---|
| 1,323,925 | 3/1963 | France. |

LOWELL A. LARSON, Primary Examiner

U.S. Cl. X.R.

72—180, 366, 379; 113—116